United States Patent Office 3,341,775
Patented Sept. 12, 1967

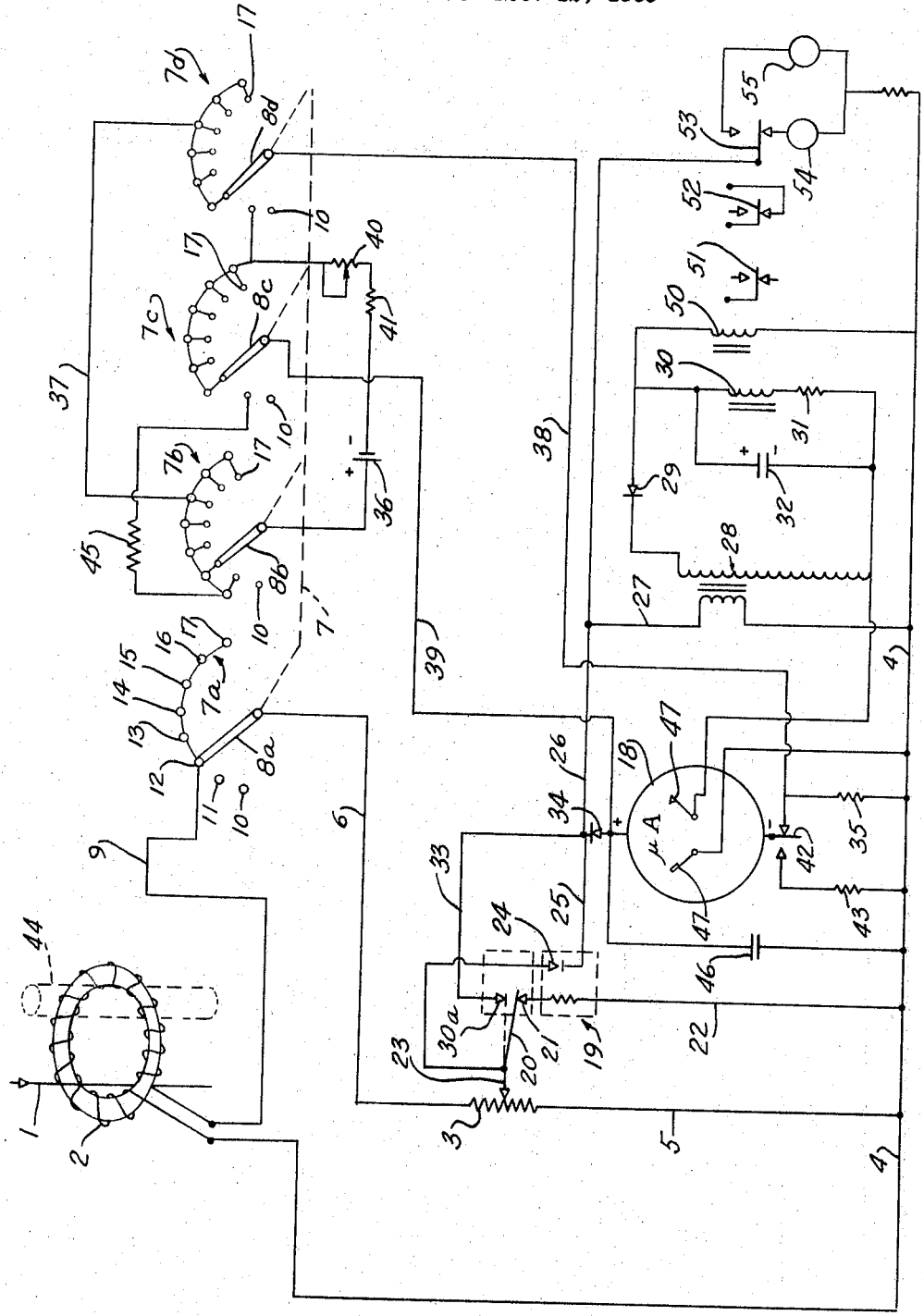

3,341,775
SURGE SUPPRESSOR FOR INSTRUMENT
MONITORING CIRCUIT
Abraham Hyman, New Hyde Park, N.Y., assignor to the
United States of America as represented by the Secretary of the Army
Filed Dec. 12, 1963, Ser. No. 330,204
5 Claims. (Cl. 324—110)

The invention described herein may be manufactured and used by or for the Government for governmental purposes without payment to me of any royalty thereon.

The present invention relates to the field of electrical and electronic instrumentation and monitoring, more particularly to a measuring and monitoring circuit which includes means for protecting said circuit against initial transient voltages and means for improving the resolution of the electrical measuring instrumentalities.

In many electrical and electronic systems, e.g., inductive and motor circuits, large initial transient voltages may be present. Electrical measuring meters and monitored devices associated with such systems must be protected against these transient voltages. Furthermore, the value of the information supplied by conventional electrical meters may sometimes be limited for instance when a differential to be measured is small in relation to the underlying current or voltage. A method or means for improving the discriminating ability or resolution of conventional meters is desirable in such situations.

Accordingly, an object of this invention is to provide a measuring and monitoring circuit for an electrical or electronic system having means to protect the measuring and monitored devices from initial transient voltages.

Another object of the invention is to provide an electrical measuring and monitoring circuit having means for improving the data resolving characteristics of its electrical measuring instrumentalities.

The nature of the invention and other objects and advantages thereof will be made clear in the description which follows and in the attached drawing. The single figure of the drawing shows a measuring and monitoring circuit of the present invention in its preferred form.

In the drawing, conductor 1 is an element of an alternating current circuit, not shown, from which measurements are to be made or which is to monitor some other device. Conductor 1 is coupled to the measuring and monitoring circuit of the present invention by toroidal coil 2. The voltage induced in the toroidal coil by the AC current in conductor 1 causes a current to flow in the path defined by conductors 4 and 5, potentiometer 3, conductor 6, arm 8a of ganged rotary selector switch 7 and conductor 9.

Ganged rotary selector switch 7 has four rotatable arms 8a, 8b, 8c and 8d which are mechanically linked so that the operator can change the position of switch arms simultaneously. Each individual switch arm 8a, 8b, 8c and 8d is associated with a bank of contacts 7a, 7b, 7c and 7d, respectively. Reading from left to right within each bank of contacts each bank comprises contacts 10, 11, 12, 13, 14, 15, 16 and 17. Within bank 7b contacts 11–17 are interconnected while contact 10 is isolated from the rest of its bank. Within banks 7a, 7c and 7d, contacts 12–17 are interconnected while contacts 10 and 11 are not directly connected to other contacts within their respective banks. Thus it can be seen that, assuming a current flow in conductor 1, a voltage will be induced across potentiometer 3 whenever switch arm 8a engages any one of the contacts 12 through 17 of bank 7a. When the switch arms engage their respective contacts 10 the measuring and monitoring system is completely cut off. When the switch arms engage contacts 11 the circuit is in a battery test condition as will be explained hereafter.

In the drawing, microammeter 18 represents the electrical measuring instrumentality which is to be protected from initial transients occurring in conductor 1 and reflected in potentiometer 3. When no current is flowing through conductor 1 thermal relay 19 is cold and switch arm 20 of the thermal relay engages contact 21. When a current commences to flow in conductor 1 a current will also flow in the thermal relay through conductor 22, switch arm 20 and potentiometer arm 23. The thermal relay must be one whose warm-up period exceeds the time period during which dangerous initial transients occur. Thus initial transients are effectively isolated from microammeter 18 and from the rest of the circuit.

After the warm up of thermal relay 19, which may require a number of seconds, thermal relay contact 24 closes permitting a current to flow through conductors 25, 26, 27 and 4 to the primary of transformer 28. The stepped-up voltage from the secondary side of transformer 28 is rectified by diode 29 and excites the coil of inductive relay means 30. Resistor 31 is connected in series with the relay coil and condenser 32 is connected across the coil and resistor as an AC bypass to eliminate relay chatter.

When relay 30 is excited switch arm 20 is attracted thereby and pivots to its alternate position indicated by dotted lines in the drawing where it engages contact 30a. The voltage across the primary of transformer 28 is thereafter maintained through the circuit comprising potentiometer arm 23, switch arm 20, contact 30a and conductors 33, 26, 27 and 4.

As switch arm 20 pivots from engagement with contact 21 to engagement with contact 30a the current through the actuating element of thermal relay 19 is broken causing contact 24 to open. The actuating element of thermal relay 19 can then cool off so that it will be in condition to protect the circuit from transient voltages when the current through conductor 1 ceases and thereafter resumes. It will be noted that when the current through 1 ceases relay 30 is deactivated and switch arm 20 returns to engagement with contact 21 readying relay 19 for a new cycle.

From the time contact 24 first closes a potential appears across diode 34, microammeter 18 and resistor 35. The current excursion of meter 18 is proportional to the current change in conductor 1. Standard cell 36 is employed to provide a meter bias potential for improving the resolving quality of the meter. Current flows from the positive terminal of the standard cell through arm 8b of the rotary selector thence through bank 7b, conductor 37, bank 7d, arm 8d and conductor 38 to the negative terminal of meter 18. The return connection from the positive terminal of the meter 18 is through conductor 39, arm 8c, bank 7c, potentiometer 40 and resistor 41 to the negative terminal of the standard cell. Potentiometer 40 is adjusted to set the quiescent signal which appears across meter 18 at the zero mark. Resistor 35 may be so chosen that the current drawn through microammeter 18 may be on the order of 50 microamperes for a nominal current change in conductor 1. Condenser 46 is connected across ammeter 18 and resistor 35 to bypass AC currents and to minimize fluctuation of the meter needle.

Toroid 2 must be designed with reference to the current values expected through conductor 1. It may be designed to reflect current values of an order as low as several hundred milliamperes or of an order as high as several hundred amperes.

Resistor 43 which, through switch 42, may be connected to meter 18 in place of resistance 35 is used in setting potentiometer 3 for a given operating level. Resistor 43 is a standard load which furnished an average condition for regulating the excursion of meter 18. An adjustable brass rod 44 indicated by dotted lines in the drawing may be used instead of potentiometer 3 to set the operating level. Rod 44 changes the field around conductor 1 and therefore the level appearing across toroid 2.

Resistor 45 which is connected between contacts 11 of banks 7b and 7c of the ganged rotary selector is part of a battery test circuit. When the ganged rotary selector is turned so that each switch arm engages its respective contact 11 the signal current from toroid 2 is cut off and the standard battery 36 is connected in a series circuit with resistor 45, the microammeter, potentiometer 40 and resistor 41. Resistor 45 is selected so that its resistance will result in a given reading (e.g., mid-scale) when the standard battery is in its rated condition. Thus when the battery is tested the deviation of the microammeter from this given reading will reflect the relative condition of the battery.

The microammeter 18 illustrated includes contacts 47 which close at a predetermined meter reading completing a circuit between the secondary of transformer 28 and relay coil 50. Relay coil 50 when excited trips switches 51, 52 and 53. Switches 51 and 52 and additional similar switches may be employed as part of a monitoring system to control motor devices or sensing devices which are monitored by the current in conductor 1. Switch 53 controls the alternative illumination of signal lights 54 and 55 which furnish a readily visible indication of whether contacts 47 are open or closed.

It will be apparent that certain changes may be made in the circuit illustrated in the drawing without departing from the spirit of the invention. For example, the conductor 1-toroid 2 arrangement by which the measuring and monitoring circuit is coupled to the primary electrical or electronic system may be replaced by other coupling arrangements or transducer devices and, in some applications, by a direct connection. The conductor-toroid combination, however, is likely to be the most satisfactory and most flexible current sensing means for the circuit. The ganged rotary selector 7 may be replaced by a suitable arrangement of individual switches and conductors. The rotary selector and the particular components illustrated are preferred, however, because they are standard, commercially available items.

I claim:
1. A protected electrical circuit for measuring and monitoring alternating current in a primary conductor comprising:
 (a) a toroidal coil inductively coupled to the primary conductor;
 (b) a first potentiometer having an adjustable tap connected across said toroidal coil;
 (c) a branch circuit comprising a rectifying means, an electrical measuring instrumentality, and a resistor connected to one side of said toroidal coil and adapted to be connected to said adjustable tap;
 (d) a transformer having its primary side connected in parallel with said branch circuit and its secondary side connected in a series circuit with a rectifying means and with a second relay means;
 (e) a thermal relay separably connected to one side of said toroidal coil and to said adjustable tap;
 (f) first separable conductor means responsive to said thermal relay for selectively connecting said adjustable tap and said branch circuit; and
 (g) second separable conductor means responsive to said second relay means for selectively, simultaneously disconnecting said thermal relay and connecting said adjustable tap and said branch circuit.

2. The electrical circuit described in claim 1 having in combination therewith meter biasing means including a standard battery, a resistor and an adjustable potentiometer connected across said electrical measuring instrumentality.

3. The electrical circuit described in claim 1 having in combination therewith:
 (a) a condenser connected across said electrical measuring instrumentality and the resistor of said branch circuit; and
 (b) a resistor connected in the series circuit with said second relay means and a condenser connected in parallel with said second relay means and said resistor.

4. The electrical circuit described in claim 1 having in combination therewith a third relay means connected in a parallel circuit with said second relay means, said parallel circuit including separable contacts controlled by said electrical measuring instrumentality, said third relay means adapted to actuate devices monitored by the electrical circuit.

5. The electrical circuit described in claim 1 wherein the electrical measuring instrumentality is a microammeter.

References Cited

UNITED STATES PATENTS

| | | | |
|---|---|---|---|
| 2,459,081 | 1/1949 | Kunz | 324—131 |
| 2,529,729 | 11/1950 | Hanson | 317—16 X |
| 2,741,527 | 4/1956 | Burger | 317—37 X |
| 2,902,651 | 9/1959 | Friedrichs | 324—110 |
| 3,259,801 | 7/1966 | Lockie | 317—40 X |

RUDOLPH V. ROLINEC, *Primary Examiner.*

WALTER L. CARLSON, *Examiner.*

J. J. MULROONEY, *Assistant Examiner.*